United States Patent
Kawasaki et al.

(10) Patent No.: US 8,942,872 B2
(45) Date of Patent: Jan. 27, 2015

(54) HYBRID CONSTRUCTION MACHINE

(75) Inventors: Haruhiko Kawasaki, Atsugi (JP); Masahiro Egawa, Kawaguchi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 312 days.

(21) Appl. No.: 13/641,632

(22) PCT Filed: Mar. 31, 2011

(86) PCT No.: PCT/JP2011/058206
§ 371 (c)(1),
(2), (4) Date: Oct. 16, 2012

(87) PCT Pub. No.: WO2011/142187
PCT Pub. Date: Nov. 17, 2011

(65) Prior Publication Data
US 2013/0035820 A1    Feb. 7, 2013

(30) Foreign Application Priority Data

May 14, 2010  (JP) .................. 2010-112077

(51) Int. Cl.
*B60L 9/00*  (2006.01)
*B60L 11/00*  (2006.01)
(Continued)

(52) U.S. Cl.
CPC ............ *E02F 9/2217* (2013.01); *B60L 3/0046* (2013.01); *B60L 11/14* (2013.01); *B60L 15/20* (2013.01); *E02F 9/2075* (2013.01); *E02F 9/2091* (2013.01); *E02F 9/2235* (2013.01); *E02F 9/2242* (2013.01); *E02F 9/2282* (2013.01); *E02F 9/2285* (2013.01); *E02F 9/2292* (2013.01); *E02F 9/2296* (2013.01); *B60L 11/187* (2013.01); *B60L 2210/30* (2013.01); *B60L 2210/40* (2013.01); *B60L 2240/421* (2013.01); *B60L 2240/545* (2013.01);
(Continued)

(58) Field of Classification Search
USPC .................................. 701/22, 50; 180/65.285
See application file for complete search history.

(56) References Cited

U.S. PATENT DOCUMENTS

2004/0148817 A1    8/2004    Kagoshima et al.

FOREIGN PATENT DOCUMENTS

| JP | 2002-325379 A | 11/2002 |
|---|---|---|
| JP | 3859982 B2 | 12/2006 |

(Continued)

*Primary Examiner* — Tuan C. To
*Assistant Examiner* — Isaac Smith
(74) *Attorney, Agent, or Firm* — Rabin & Berdo, P.C.

(57) ABSTRACT

A hybrid construction machine includes a distribution ratio setting unit that reduces an output distribution ratio of a motor generator by controlling an output control mechanism for controlling the output distribution ratio of the motor generator relative to an engine and increases an output distribution ratio of the engine by an amount corresponding to a reduction in the output distribution ratio of the motor generator when a temperature of a battery is lower than a threshold value in a low-temperature region or higher than a threshold value in a high-temperature region, and a regeneration amount control unit that reduces a hydraulic regeneration amount for the hydraulic motor by controlling an input control mechanism for controlling the hydraulic regeneration amount for the hydraulic motor when the temperature of the battery is lower than the threshold value in the low-temperature region or higher than the threshold value in the high-temperature region.

7 Claims, 6 Drawing Sheets

(51) Int. Cl.

| | | |
|---|---|---|
| | *G05D 1/00* | (2006.01) |
| | *E02F 9/22* | (2006.01) |
| | *B60L 3/00* | (2006.01) |
| | *B60L 11/14* | (2006.01) |
| | *B60L 15/20* | (2006.01) |
| | *E02F 9/20* | (2006.01) |
| | *B60L 11/18* | (2006.01) |

(52) U.S. Cl.
CPC .......... *B60L 2270/145* (2013.01); *Y02T 10/642* (2013.01); *Y02T 10/7077* (2013.01); *Y02T 10/7241* (2013.01); *Y02T 10/7005* (2013.01); *Y02T 10/705* (2013.01); *Y02T 10/7011* (2013.01)
USPC .......................... 701/22; 701/50; 180/65.285

(56) References Cited

FOREIGN PATENT DOCUMENTS

| | | |
|---|---|---|
| JP | 2007-228721 A | 9/2007 |
| JP | 2008-255699 A | 10/2008 |
| WO | WO 2010053179 A1 * | 5/2010 |

\* cited by examiner

HYBRID CONSTRUCTION MACHINE

TECHNICAL FIELD

The present invention relates to a hybrid construction machine.

BACKGROUND ART

Most hybrid construction machines include a battery of a chemical reaction associated type such as a lithium-ion battery. A characteristic of the battery of the chemical reaction associated type is that an operating temperature range is limited. For example, the battery cannot be used at or below a certain low temperature T1 or at or above a high temperature T4, and usable power of the battery is limited near such temperatures. Thus, there is a limit that the battery can be normally used only in a proper temperature range of T2 to T3.

Thus, conventionally, a heating and cooling device is provided in the case of installing a battery associated with chemical reaction in a construction machine and the temperature of the battery is maintained in the proper temperature range of T2 to T3 by the heating and cooling device as disclosed in JP3859982B.

SUMMARY OF INVENTION

However, in the above invention, a space is formed between two plates if the plates are deformed due to a difference in linear expansion coefficient at a high outside temperature, i.e. according to an actual temperature of a case or temperature around the case. Thus, there is a problem that heat is transferred into the interior of the case via the plates from the outside between the two plates and temperature inside the case increases.

Since it is conventionally necessary to install the heating and cooling device, there has been a problem of drastically increasing cost.

Further, unless being heated by a heating device for a long time, the battery cannot be used in a low-temperature region, particularly at initial start in the cold morning. Thus, there has been a problem that not only operability is poor, but also energy loss by heating is large.

Since the battery has to be cooled by a cooling device also at a high temperature, there has been a problem that not only operability is poor, but also energy loss by cooling is large as at a low temperature.

The present invention aims to provide a hybrid construction machine which can be normally operated even at a low or high temperature using a battery associated with chemical reaction.

One aspect of the present invention is directed to a hybrid construction machine, including a main pump; an engine for driving the main pump; an assist pump connected to a discharge side of the main pump via a joint passage; a hydraulic motor rotated by return oil from an actuator; a motor generator linked to the assist pump and the hydraulic motor; an output control mechanism for controlling an output distribution ratio of the motor generator relative to the engine; an input control mechanism for controlling a hydraulic regeneration amount for the hydraulic motor; a battery associated with chemical reaction and connected to the motor generator; a temperature detection unit for detecting the temperature of the battery; a determination unit for determining whether or not the temperature of the battery is lower than a threshold value in a low-temperature region or higher than a threshold value in a high-temperature region; a distribution ratio setting unit for reducing the output distribution ratio of the motor generator by controlling the output control mechanism and increasing an output distribution ratio of the engine by an amount corresponding to a reduction in the output distribution ratio of the motor generator when the temperature of the battery is lower than the threshold value in the low-temperature region or higher than the threshold value in the high-temperature range; and a regeneration amount control unit for reducing the hydraulic regeneration amount for the hydraulic motor by controlling the input control mechanism when the temperature of the battery is lower than the threshold value in the low-temperature region or higher than the threshold value in the high-temperature region.

According to the aspect of the present invention, operability is not affected even if the battery temperature is a low temperature or high temperature beyond a proper range. Thus, it is not necessary to install a heating and cooling device and cost can be reduced to that extent. In addition, there is no energy loss caused by heating and cooling, which contributes to energy saving.

If the engine rotates for a certain time, the engine is heated and the battery can be heated by the heat of the engine. Therefore, the battery can be effectively utilized even in the absence of a heating device at a low temperature.

An embodiment of the present invention and advantages thereof are described in detail below with reference to the accompanying drawings.

EMBODIMENT OF INVENTION

Figure 1:
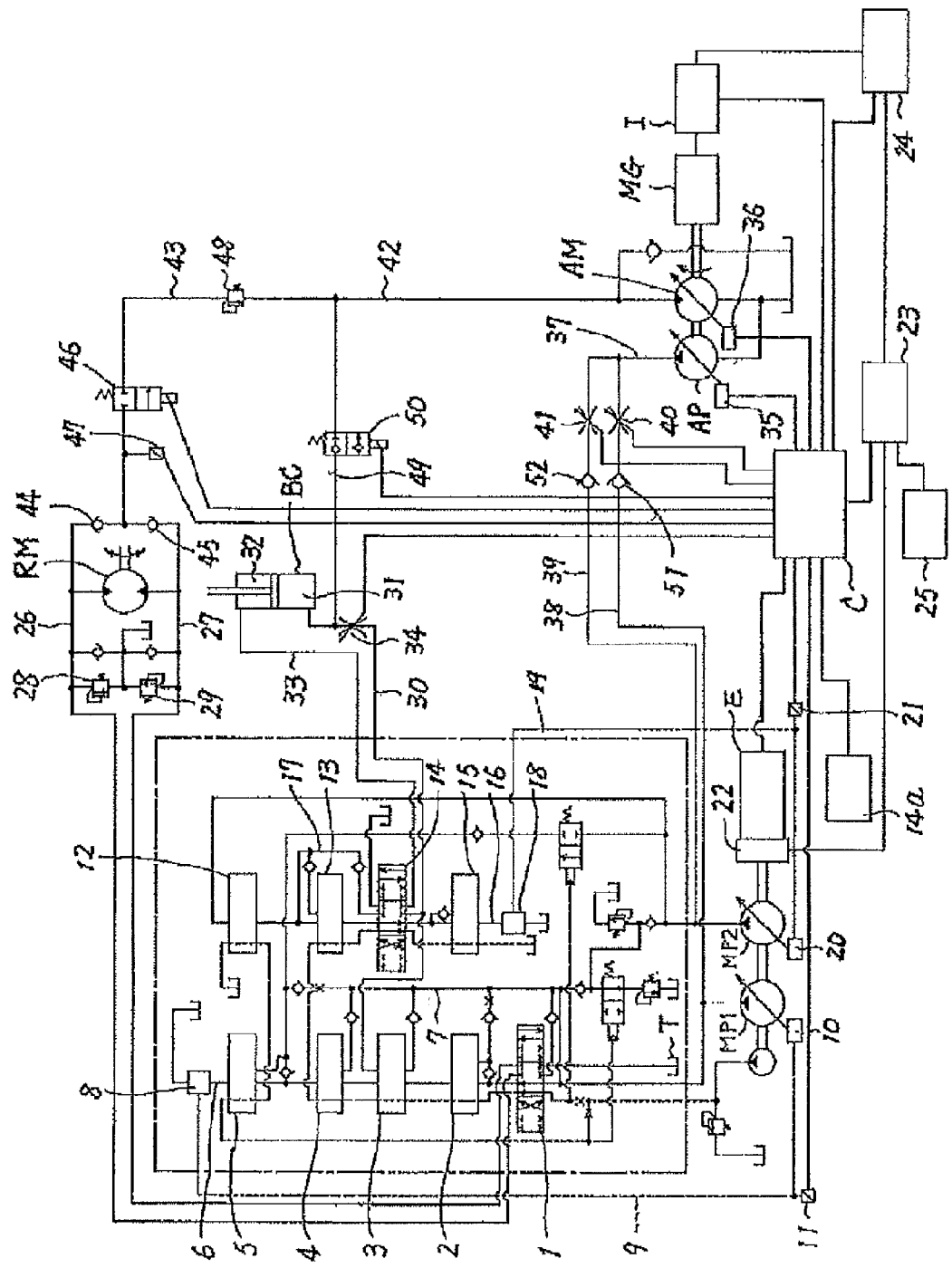
FIG. 1 is a diagram showing an embodiment of the present invention.

FIG. 1 is a diagram showing a control system of a power shovel which is a hybrid construction machine. The control system of the power shovel includes first and second main pumps MP1, MP2 which are of a variable-displacement type. A first circuit system is connected to the first main pump MP1, and a second circuit system is connected to the second main pump MP2.

To the first circuit system are connected an operation valve 1 for controlling a rotation motor RM, an operation valve 2 for arm first speed for controlling an arm cylinder, an operation valve 3 for boom second speed for controlling a boom cylinder BC, an operation valve 4 for controlling an unillustrated auxiliary attachment and an operation valve 5 for controlling an unillustrated left travel motor in this order from an upstream side.

Each of the operation valves 1 to 5 is connected to the first main pump MP1 via a neutral flow path 6 and a parallel passage 7.

A pilot pressure generating mechanism 8 is provided downstream of the operation valve 5 for the left travel motor in the neutral flow path 6. The pilot pressure generating mechanism 8 generates a high pilot pressure if a flow rate of fluid flowing through the pilot pressure generating mechanism 8 is high while generating a low pilot pressure if the flow rate of the fluid flowing through the pilot pressure generating mechanism 8 is low.

The neutral flow path 6 introduces all or part of fluid discharged from the first main pump MP1 to a tank T when all the operation valves 1 to 5 are at or near a neutral position. In this case, a high pilot pressure is generated since the flow rate of the fluid flowing through the pilot pressure generating mechanism 8 is high.

If the operation valves 1 to 5 are switched in a full-stroke state, the neutral flow path 6 is closed and the fluid does not flow any longer. Accordingly, the flow rate of the fluid flowing through the pilot pressure generating mechanism 8 becomes almost zero, wherefore the pilot pressure is kept at zero.

Depending on the operating amounts of the operation valves 1 to 5, part of pump-discharged fluid is introduced to actuators and part thereof is introduced to the tank T from the neutral flow path 6. Thus, the pilot pressure generating mechanism 8 generates a pilot pressure corresponding to the flow rate in the neutral flow path 6. In other words, the pilot pressure generating mechanism 8 generates the pilot pressure corresponding to the operating amounts of the operation valves 1 to 5.

A pilot flow path 9 is connected to the pilot pressure generating mechanism 8. The pilot flow path 9 is connected to a regulator 10 for controlling a tilting angle of the first main pump MP1. The regulator 10 controls the discharge amount of the first main pump MP1 in inverse proportion to a pilot pressure. Accordingly, the discharge amount of the first main pump MP1 is kept at a maximum level if there is no more flow in the neutral flow path 6 by setting the operation valves 1 to 5 in the full-stroke state, in other words, if the pilot pressure generated by the pilot pressure generating mechanism 8 becomes zero.

A first pressure sensor 11 is connected to the pilot flow path 9. A pressure signal detected by the first pressure sensor 11 is input to a controller C.

To the second circuit system are connected an operation valve 12 for controlling an unillustrated right travel motor, an operation valve 13 for controlling an unillustrated bucket cylinder, an operation valve 14 for boom first speed for controlling the boom cylinder BC, and an operation valve 15 for arm second speed for controlling the arm cylinder in this order from an upstream side. The operation valve 14 for boom first speed includes a sensor 14a for detecting an operating direction and an operating amount.

Each of the operation valves 12 to 15 is connected to the second main pump MP2 via a neutral flow path 16. The operation valve 13 for bucket and the operation valve 14 for boom first speed are connected to the second main pump MP2 via a parallel passage 17.

A pilot pressure generating mechanism 18 is provided downstream of the operation valve 15 for boom second speed in the neutral flow path 16. The pilot pressure generating mechanism 18 functions in just the same manner as the pilot pressure generating mechanism 8 described above.

A pilot flow path 19 is connected to the pilot pressure generating mechanism 18. The pilot flow path 19 is connected to a regulator 20 for controlling a tilting angle of the second main pump MP2. The regulator 20 controls the discharge amount of the second main pump MP2 in inverse proportion to a pilot pressure. Accordingly, the discharge amount of the second main pump MP2 is kept at a maximum level if there is no more flow in the neutral flow path 16 by setting the operation valves 12 to 15 in the full-stroke state, in other words, if the pilot pressure generated by the pilot pressure generating mechanism 18 becomes zero.

A second pressure sensor 21 is connected to the pilot flow path 19. A pressure signal detected by the second pressure sensor 21 is input to the controller C.

The first and second main pumps MP1, MP2 are coaxially rotated by a drive force of one engine E. The engine E is electrically connected to the controller C. Output power and a rotational speed coefficient of the engine E can be controlled by the controller C.

The engine E includes a generator 22. The generator 22 can generate power by an excess output of the engine E. Power generated by the generator 22 is charged into a lithium-ion battery 24 associated with chemical reaction via a battery charger 23. The battery charger 23 is connected to the controller C. The controller C can electrically connect and disconnect the generator 22 and the lithium-ion battery 24.

The battery charger 23 can charge power into the lithium-ion battery 24 when being connected to a normal household power supply 25. That is, the battery charger 23 is also connectable to an independent power supply different from the system of this embodiment.

Passages 26, 27 communicating with the rotation motor RM are connected to actuator ports of the operation valve 1 for the rotation motor RM connected to the first circuit system. Brake valves 28, 29 are connected to each of the both passages 26, 27. When the operation valve 1 for the rotation motor RM is kept at the neutral position, the actuator ports are closed and the rotation motor RM is maintained in a stopped state.

When the operation valve 1 for the rotation motor RM is switched to a right position of FIG. 1 from the above state, one passage 26 is connected to the first main pump MP1 and the other passage 27 communicates with the tank T. Accordingly, pressure fluid is supplied from the passage 26 to rotate the rotation motor RM. Further, return fluid from the rotation motor RM is returned to the tank T via the passage 27.

When the operation valve 1 for the rotation motor is switched to a left position of FIG. 1, pump-discharged fluid is supplied to the passage 27, the passage 26 communicates with the tank T and the rotation motor RM rotates in a reverse direction.

When the rotation motor RM is driven, the brake valve 28 or 29 fulfills a function of a relief valve. When the pressures in the passages 26, 27 become equal to or higher than a set pressure, the brake valves 28, 29 are opened to introduce the fluid at a high pressure side toward a low pressure side.

Further, if the operation valve 1 for the rotation motor RM is returned to the neutral position in a state where the rotation motor RM is rotating, the actuator ports of the operation valve 1 are closed. Even if the actuator ports of the operation valve 1 are closed, the rotation motor RM continues to rotate due to inertial energy. In this way, the rotation motor RM functions as a pump. In this case, a closed circuit is formed by the passages 26, 27, the rotation motor RM and the brake valve 28 or 29 and the inertial energy is converted into thermal energy by the brake valve 28 or 29.

On the other hand, when the operation valve 14 for boom first speed is switched to a right position of FIG. 1 from the neutral position, pressure fluid discharged from the second main pump MP2 is supplied to a piston-side chamber 31 of the boom cylinder BC via a passage 30 and return fluid from a rod-side chamber 32 of the boom cylinder BC is returned to the tank T via a passage 33 and the boom cylinder BC extends.

On the contrary, when the operation valve 14 for boom first speed is switched to the left of FIG. 1, the pressure fluid discharged from the second main pump MP2 is supplied to the rod-side chamber 32 of the boom cylinder BC via the passage 33 and return fluid from the piston-side chamber 31 of the boom cylinder BC is returned to the tank T via the passage 30 and the boom cylinder BC contracts. The operation valve 3 for boom second speed is switched in conjunction with the operation valve 14 for boom first speed.

A proportional electromagnetic valve 34 whose opening is controlled by the controller C is provided in the passage 30 connecting the piston-side chamber 31 of the boom cylinder BC and the operation valve 14 for boom first speed. The proportional electromagnetic valve 34 is kept at a fully open position in a normal state.

Next, a variable-displacement type assist pump AP which assists outputs of the first and second main pumps MP1, MP2 is described.

The variable-displacement type assist pump AP is rotated by a drive force of a motor generator MG which doubles as a generator. A variable-displacement type hydraulic motor AM is also coaxially rotated by the drive force of the motor generator MG. An inverter I is connected to the motor generator MG. The invertor I is connected to the controller C, which controls the rotational speed and the like of the motor generator MG.

Further, tilting angles of the assist pump AP and the hydraulic motor AM are controlled by tilting angle controllers 35, 36. The tilting angle controllers 35, 36 are controlled by output signals of the controller C.

A discharge passage 37 is connected to the assist pump AP. The discharge passage 37 is branched into a first joint passage 38 which joins at a discharge side of the first main pump MP1 and a second joint passage 39 which joins at a discharge side of the second main pump MP2. First and second proportional electromagnetic throttle valves 40, 41 whose openings are controlled by output signals of the controller C are provided in the respective first and second joint passages 38, 39.

A connection passage 42 is connected to the hydraulic motor AM. The connection passage 42 is connected to the passages 26, 27 connected to the rotation motor RM via a joint passage 43 and check valves 44, 45. A regeneration flow controlling electromagnetic valve 46 controlled to be opened and closed by the controller C is provided in the joint passage 43. A pressure sensor 47 for detecting a pressure at the time of rotating the rotation motor RM and a pressure at the time of braking is provided between the regeneration flow controlling electromagnetic valve 46 and the check valves 44, 45. A pressure signal of the pressure sensor 47 is input to the controller C.

A safety valve 48 is provided at a position downstream of the regeneration flow controlling electromagnetic valve 46 with respect to a flow from the rotation motor RM to the connection passage 42 in the joint passage 43. The safety valve 48 prevents runaway of the rotation motor RM by maintaining the pressures in the passages 26, 27 in the event of a failure in a system including the connection passages 42, 43 such as the regeneration flow controlling electromagnetic valve 46.

Further, a passage 49 communicating with the connection passage 42 is provided between the boom cylinder BC and the proportional electromagnetic valve 34. A regeneration flow controlling electromagnetic valve 50 controlled by the controller C is provided in the passage 49.

Functions of this embodiment are described below.

If the operation valves 1 to 5 of the first circuit system are kept at the neutral position, the total amount of the fluid discharged from the first main pump MP1 is introduced to the tank T via the neutral flow path 6 and the pilot pressure generating mechanism 8. When the total amount of the discharge from the first main pump MP1 flows though the pilot pressure generating mechanism 8, the pilot pressure generated by the pilot pressure generating mechanism 8 increases and a relatively high pilot pressure is introduced to the pilot flow path 9. By the action of the high pilot pressure introduced to the pilot flow path 9, the regulator 10 operates and the discharge amount of the first main pump MP1 is kept at a minimum level. A pressure signal of the high pilot pressure at this time is input to the controller C from the first pressure sensor 11.

Also when the operation valves 12 to 15 of the second circuit system are kept at the neutral position, the pilot pressure generating mechanism 18 generates a relatively high pilot pressure as in the case of the first circuit system. This high pressure acts on the regulator 20, whereby the discharge amount of the second main pump MP2 is kept at a minimum level. A pressure signal of the high pilot pressure at this time is input to the controller C from the second pressure sensor 21.

When the relatively high pressure signals are input to the controller C from the first and second pressure sensors 11, 21, the controller C controls the tilting angle controllers 35, 36 to zero or minimize the tilting angles of the assist pump AP and the hydraulic motor AM, judging that the first and second main pumps MP1, MP2 maintain their minimum discharge amounts.

Note that the controller C may stop the rotation of the motor generator MG or may continue the rotation of the motor generator MG when receiving signals to the effect that the discharge amounts of the first and second main pumps MP1, MP2 are minimum.

In the case of stopping the rotation of the motor generator MG, there is an effect of being able to save power consumption. In the case of continuing the rotation of the motor generator MG, the assist pump AP and the hydraulic motor AM also continue to rotate. Thus, there is an effect of being able to reduce a shock when the assist pump AP and the hydraulic motor AM are started. Whether to stop or to continue to rotate the motor generator MG is determined according to the intended use and the status of use of the construction machine.

If any of the operation valves of the first circuit system or the second circuit system is switched in a condition where the pilot pressure generated by the pilot pressure generating mechanism 8 or 18 is high, the flow rate in the neutral flow path 6 or 16 is reduced according to the operating amount of the operation valve. Accordingly, the pilot pressure generated by the pilot pressure generating mechanism 8 or 18 is reduced. As the pilot pressure is reduced, the first main pump MP1 or the second main pump MP2 increases the tilting angle to increase the discharge amount.

When the discharge amount of the first main pump MP1 or the second main pump MP2 increases, the controller C keeps the motor generator MG in a constantly rotating state. That is, if the motor generator MG is stopped when the discharge amounts of the first and second main pumps MP1, MP2 are minimum, the controller C detects a reduction in the pilot pressure and restarts the motor generator MG.

The controller C controls the openings of the proportional electromagnetic throttle valves 40, 41, proportionally distributes the discharge amount of the assist pump AP and supplies it to the first and second circuit systems in accordance with pressure signals of the first and second pressure sensors 11, 21.

Since the controller C can control the tilting angle of the assist pump AP and the openings of the first and second proportional electromagnetic throttle valves 40, 41 only in accordance with the pressure sensors of the two first and second pressure sensors 11, 21 according to this embodiment, the number of pressure sensors can be reduced.

On the other hand, if the operation valve 1 for the rotation motor RM is switched to either the left or right, e.g. to the right position of FIG. 1 to drive the rotation motor RM connected to the first circuit system, the passage 26 communicates with the first main pump MP1, the passage 27 communicates with the tank T and the rotation motor RM rotates. A rotational pressure at this time is kept at a set pressure of the brake valve 28. Further, if the operation valve 1 is switched to the left of FIG. 1, the passage 27 communicates with the first main pump MP1, the passage 26 communicates with the tank T and the rotation motor RM rotates. A rotational pressure at this time is also kept at a set pressure of the brake valve 29.

If the operation valve 1 for the rotation motor RM is switched to the neutral position while the rotation motor RM is rotating, a closed circuit is formed between the passages 26 and 27. The brake valve 28 or 29 maintains a brake pressure of the closed circuit to convert inertial energy to thermal energy.

The pressure sensor 47 detects the rotational pressure or the brake pressure and inputs a corresponding pressure signal to the controller C. The controller C switches the regeneration flow controlling electromagnetic valve 46 at the time of detecting a pressure lower than the set pressure of the brake valves 28, 29 in such a range as not to affect the rotation of the rotation motor RM or a braking operation. If the regeneration flow controlling electromagnetic valve 46 is switched, pressure fluid introduced to the rotation motor RM flows into the joint passage 43 and is supplied to the hydraulic motor AM via the safety valve 48 and the connection passage 42.

In this case, the controller C controls the tilting angle of the hydraulic motor AM in accordance with a pressure signal from the pressure sensor 47. A control executed here is as follows.

Unless the pressure in the passage 26 or 27 is kept at a pressure necessary for a rotating operation or a braking operation, it is not possible to rotate the rotation motor RM or apply braking.

Accordingly, to keep the pressure in the passage 26 or 27 at the rotational pressure or the braking pressure, the controller C controls a load of the rotation motor RM while controlling the tilting angle of the hydraulic motor AM. That is, the controller C controls the tilting angle of the hydraulic motor AM so that the pressure detected by the pressure sensor 47 is substantially equal to the rotational pressure of the rotation motor RM or the brake pressure.

If the hydraulic motor AM obtains a rotational force in the above manner, the rotational force of the hydraulic motor AM acts on the motor generator MG that coaxially rotates. The rotational force of the hydraulic motor AM acts as an assist force for the motor generator MG. Thus, power consumption of the motor generator MG can be reduced by an amount corresponding to the rotational force of the hydraulic motor AM.

It is also possible to assist the rotational force of the assist pump AP by the rotational force of the hydraulic motor AM.

Next, there is described a case where the boom cylinder BC is controlled by switching the operation valve 14 for boom first speed and the operation valve 3 for boom second speed of the first circuit system in conjunction with the operation valve 14.

If the operation valve 14 for boom first speed and the operation valve 3 in conjunction with the operation valve 14 are switched to actuate the boom cylinder BC, an operating direction and an operating amount of the operation valve 14 are detected by the sensor 14a. An operation signal of the operation valve 14 is input to the controller C.

In accordance with the operation signal of the sensor 14a, the controller C determines whether an operator is trying to raise or lower the boom cylinder BC.

If a signal for raising the boom cylinder BC is input to the controller C, the controller C keeps the proportional electromagnetic valve 34 in the normal state. In other words, the proportional electromagnetic valve 34 is kept at the fully open position. In this case, to ensure a predetermined discharge amount from the assist pump AP, the controller C keeps the regeneration flow controlling electromagnetic valve 50 at the closed position to control the rotational speed of the motor generator MG and the tilting angle of the assist pump AP.

On the other hand, if a signal for lowering the boom cylinder BC is input to the controller C from the sensor 14a, the controller C calculates a lowering speed of the boom cylinder BC required by the operator according to the operating amount of the operation valve 14, closes the proportional electromagnetic valve 34 and switches the regeneration flow controlling electromagnetic valve 50 to the open position.

If the proportional electromagnetic valve 34 is closed and the regeneration flow controlling electromagnetic valve 50 is switched to the open position, the total amount of return fluid from the boom cylinder BC is supplied to the hydraulic motor AM. However, if the flow consumed by the hydraulic motor AM is less than the flow necessary to maintain the lowering speed required by the operator, the boom cylinder BC cannot maintain the lowering speed required by the operator. In such a case, the controller C maintains the lowering speed of the boom cylinder BC required by the operator by controlling the opening of the proportional electromagnetic valve 34 to return the flow equal to or more than the flow consumed by the hydraulic motor AM to the tank T based on the operating amount of the operation valve 14, the tilting angle of the hydraulic motor AM, the rotational speed of the motor generator MG and the like.

If the fluid is supplied to the hydraulic motor AM, the hydraulic motor AM rotates and the rotational force of the hydraulic motor AM acts on the motor generator MG that coaxially rotates. The rotational force of the hydraulic motor AM acts as an assist force for the motor generator MG. Thus, power consumption can be reduced by an amount corresponding to the rotational force of the hydraulic motor AM.

It is also possible to rotate the assist pump AP only by the rotational force of the hydraulic motor AM without supplying power to the motor generator MG. In this case, the hydraulic motor AM and the assist pump AP fulfill a pressure conversion function in the same manner as described above.

In the case of using the hydraulic motor AM as a drive source and the motor generator MG as a generator, the motor generator MG can be caused to fulfill a power generation function utilizing an output of the hydraulic motor AM if a substantially no-load state is set by setting the tilting angle of the assist pump AP to zero and an output necessary to rotate the motor generator MG is maintained for the hydraulic motor AM.

Note that, denoted by 51, 52 in FIG. 1 are check valves which are provided downstream of the first and second proportional electromagnetic throttle valves 40, 41 and permit only flows from the assist pump AP toward the first and second main pumps MP1, MP2.

In this embodiment, the total output of the engine E and the motor generator MG is 1 and an output distribution ratio of the engine E is 0.8 and that of the motor generator MG is 0.2 when the lithium-ion battery 24 is in a normal temperature range. However, the output distribution ratio in the normal temperature range can be freely set according to purpose.

The controller C monitors the temperature of the lithium-ion battery 24 and adjusts the output distribution ratio in the normal temperature range as described below when the temperature of the lithium-ion battery 24 falls below a threshold value in a low-temperature region or exceeds a threshold value in a high-temperature region set in advance.

Figure 2:
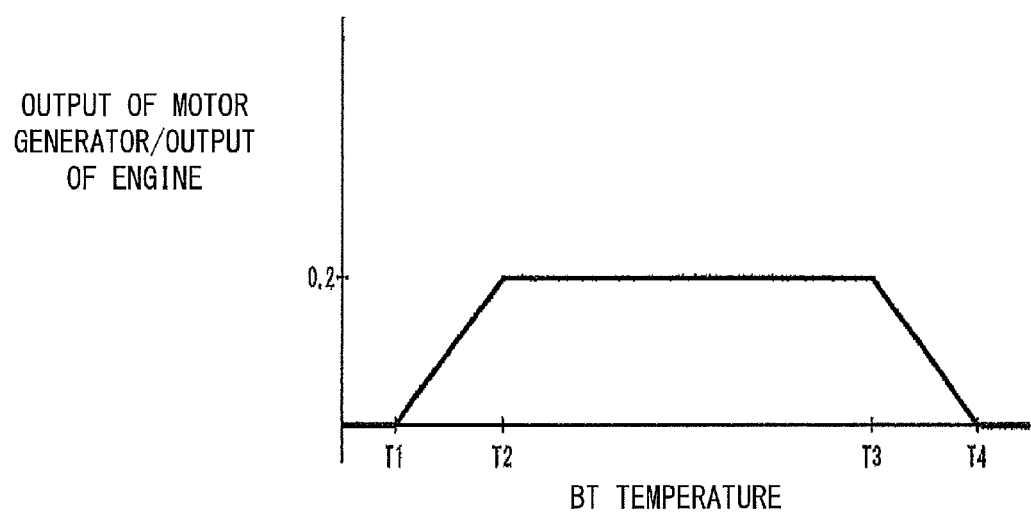
FIG. 2 is a graph showing an output characteristic of a motor.
Figure 3:
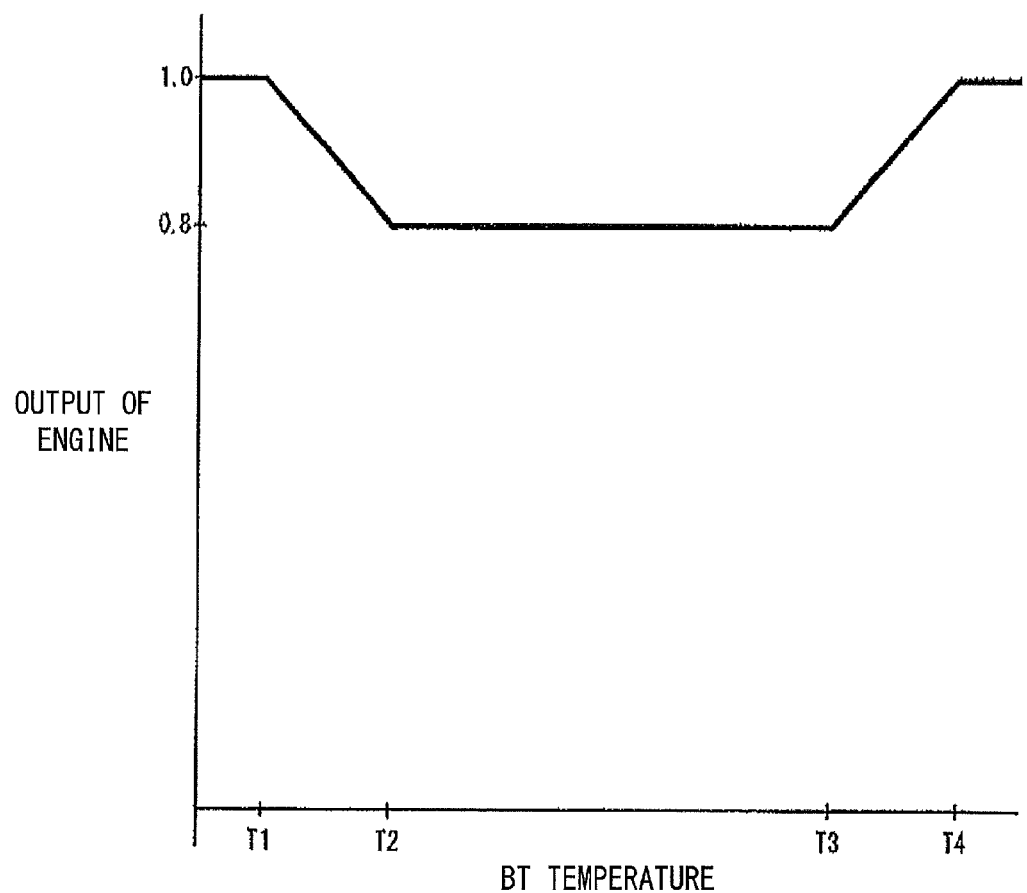
FIG. 3 is a graph showing an output characteristic of an engine.

The controller C stores the output distribution ratios of the engine E and the motor generator MG in the normal temperature range of the lithium-ion battery 24 in advance. For example, if a battery temperature Tb is in a normal temperature range T2 to T3, the pre-stored output distribution ratio of the engine E is 0.8 and that of the motor generator MG is 0.2 as shown in FIGS. 2 and 3.

The controller C increases the output distribution ratio of the engine E according to a temperature change when the battery temperature Tb falls below a threshold value T2 in the low-temperature region and reduces the output distribution ratio of the motor generator MG to that extent. Further, when the battery temperature Tb further falls below a threshold value T1 relating to the a minimum temperature, the output of the motor generator MG is set to zero and a share of the motor generator MG is covered by the output of the engine E. That is, the controller C controls such that the total output of the engine E and the motor generator MG becomes 1 by reducing the output of the motor generator MG according to the output distribution and, on the other hand, increasing the rotational speed of the engine E by an amount corresponding to a reduction in the output distribution of the motor generator MG.

For example, to control the output distribution of the motor generator MG, the tilting angle of the assist pump AP is controlled by controlling the tilting angle controller 35 of the assist pump AP. If the tilting angle of the assist pump AP is reduced, a load of the motor generator MG can be reduced to that extent, wherefore the output distribution of the motor generator MG can be substantially reduced.

The lithium-ion battery 24 associated with chemical reaction is affected by temperature also in the case of being charged.

Accordingly, in this embodiment, the controller C limits a hydraulic regeneration amount based on a given threshold value while monitoring the temperature of the lithium-ion battery 24.

Figure 4:
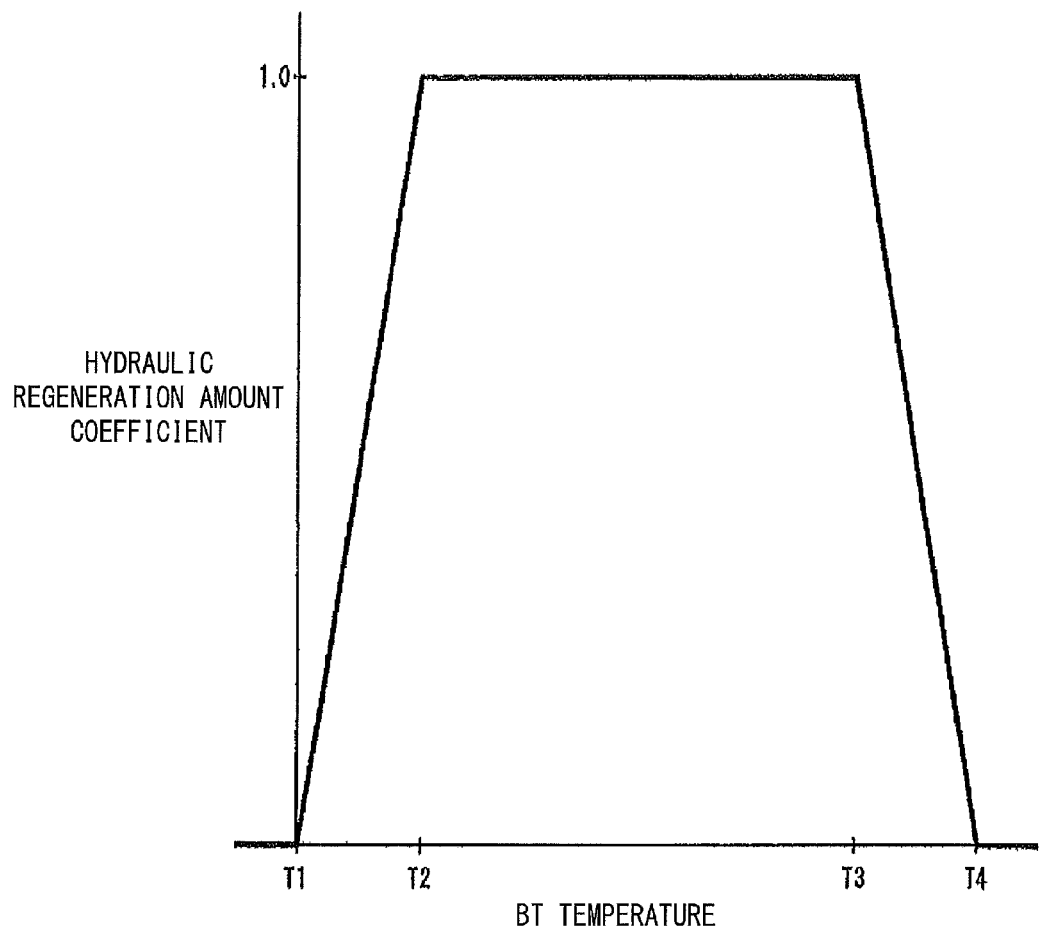
FIG. 4 is a graph showing a hydraulic regeneration amount limiting characteristic using a valve.

FIG. 4 is a graph showing a hydraulic regeneration amount coefficient characteristic in the case of controlling the regeneration flow flowing into the hydraulic motor AM. The controller C keeps a hydraulic regeneration amount coefficient at 1 when the temperature of the lithium-ion battery 24 is in the normal temperature range T2 to T3 and controls the opening of the regeneration flow controlling electromagnetic valve 46 or 50 based on an output multiplied by the hydraulic regeneration amount coefficient "1".

The controller C controls the opening of the regeneration flow controlling electromagnetic valve 46 or 50 based on an output multiplied by a hydraulic regeneration amount coefficient smaller than "1" when the temperature of the lithium-ion battery 24 falls below the threshold value T2 in the low-temperature region. Accordingly, the opening of the regeneration flow controlling electromagnetic valve 46 is relatively smaller when the temperature of the lithium-ion battery 24 falls below the threshold value T2 in the low-temperature region than when the temperature of the lithium-ion battery 24 is in the normal temperature range T2 to T3, whereby the hydraulic regeneration flow is limited.

The controller C controls the opening of the regeneration flow controlling electromagnetic valve 46 or 50 based on an output multiplied by a hydraulic regeneration amount coefficient smaller than "1" when the temperature of the lithium-ion battery 24 exceeds the threshold value T3 in the high-temperature region. Accordingly, the opening of the regeneration flow controlling electromagnetic valve 46 is relatively smaller when the temperature of the lithium-ion battery 24 exceeds the threshold value T3 in the high-temperature region than when the temperature of the lithium-ion battery 24 is in the normal temperature range T2 to T3, whereby the hydraulic regeneration flow is limited.

The controller C sets the hydraulic regeneration amount coefficient to zero and keeps the regeneration flow controlling electromagnetic valve 46 or 50 in the closed state when the temperature of the lithium-ion battery 24 falls below the minimum temperature T1 in the low-temperature region or exceeds a maximum temperature T4 in the high-temperature region. If the regeneration flow controlling electromagnetic valve 46 or 50 is kept in the closed state, no regeneration flow is supplied to the hydraulic motor AM, wherefore the hydraulic motor AM does not rotate and a power generation ability of the motor generator MG becomes zero.

Figure 5:
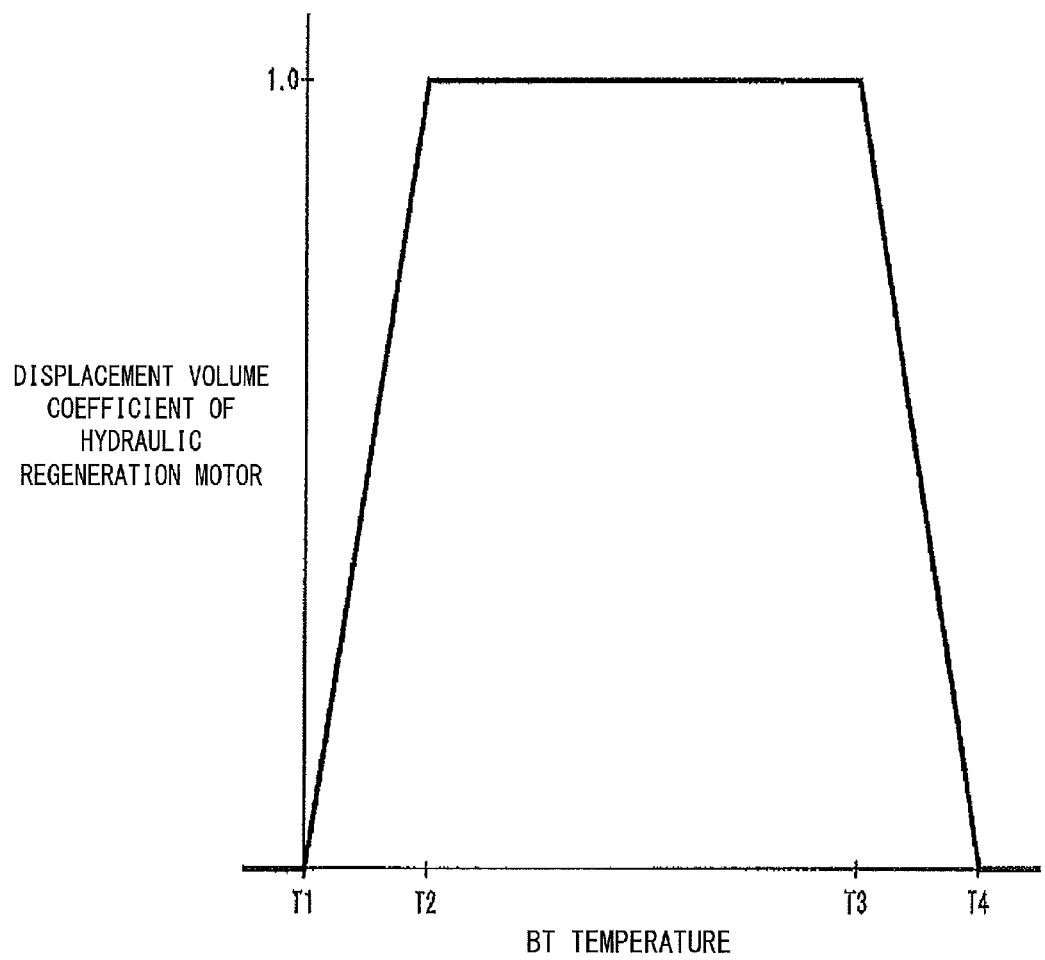
FIG. 5 is a graph showing a hydraulic regeneration amount limiting characteristic by a displacement volume of a hydraulic motor.

Limitation of the hydraulic regeneration amount can also be achieved by controlling a displacement volume of the hydraulic motor AM in addition to controlling the regeneration flow controlling electromagnetic valves 46, 50. FIG. 5 is a graph showing a displacement volume coefficient characteristic.

As shown in FIG. 5, the controller C keeps a displacement volume coefficient at "1" and controls the displacement volume of the hydraulic motor AM by controlling the tilting angle controller 36 based on an output multiplied by the displacement volume coefficient "1" when the temperature of the lithium-ion battery 24 is in the normal temperature range T2 to T3.

The controller C controls the displacement volume of the hydraulic motor AM by controlling the tilting angle controller 36 based on an output multiplied by a displacement volume coefficient smaller than "1" when the temperature of the lithium-ion battery 24 falls below the threshold value T2 in the low-temperature region. Accordingly, the tilting angle of the hydraulic motor AM is relatively smaller when the temperature of the lithium-ion battery 24 falls below the threshold value T2 in the low-temperature region than when the temperature of the lithium-ion battery 24 is in the normal temperature range T2 to T3, whereby the hydraulic regeneration flow is limited.

The controller C controls the displacement volume of the hydraulic motor AM by controlling the tilting angle controller 36 based on an output multiplied by a displacement volume coefficient smaller than "1" when the temperature of the lithium-ion battery 24 exceeds the threshold value T3 in the high-temperature region. Accordingly, the tilting angle of the hydraulic motor AM is relatively smaller when the temperature of the lithium-ion battery 24 exceeds the threshold value T3 in the high-temperature region than when the temperature of the lithium-ion battery 24 is in the normal temperature range T2 to T3, whereby the hydraulic regeneration flow is limited.

The controller C sets the displacement volume coefficient to zero, the output of the tilting angle controller 36 to zero and also the displacement volume of the hydraulic motor AM to zero when the temperature of the lithium-ion battery 24 falls below the minimum temperature T1 in the low-temperature region or exceeds the maximum temperature T4 in the high-temperature region. If the displacement volume of the hydraulic motor AM becomes zero, the hydraulic motor AM does not rotate, wherefore power generated by the motor generator MG also becomes zero.

Figure 6:
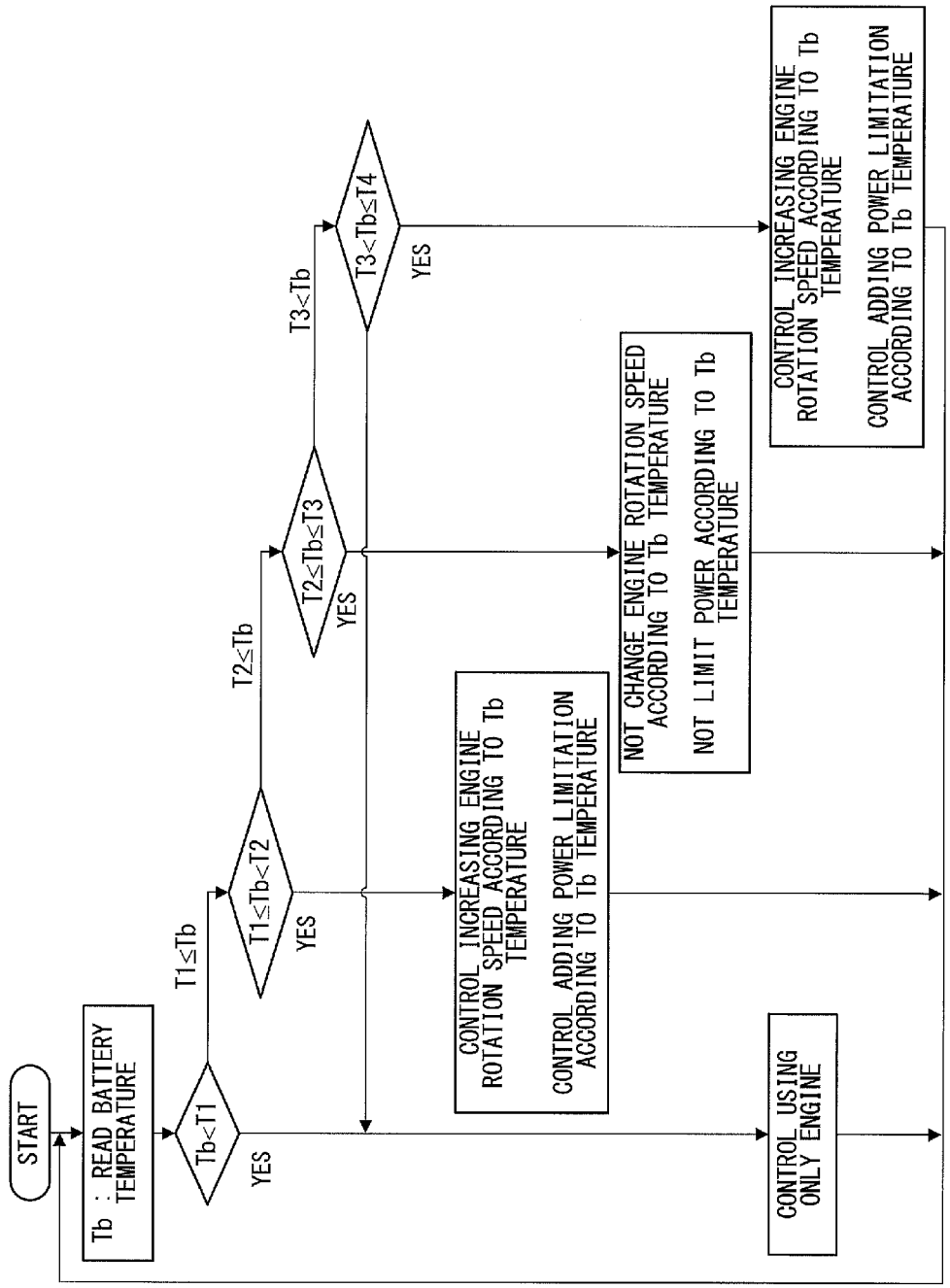
FIG. 6 is a flow chart.

FIG. 6 is a flow chart showing the above control of the controller C.

As shown in FIG. 6, the controller C reads the temperature Tb of the lithium-ion battery 24 and determines whether or not the temperature Tb is below the threshold value temperature T1 relating to the minimum temperature. If the temperature Tb is below the threshold value temperature T1, a control using only the engine E is executed.

It is determined whether or not the temperature Tb of the lithium-ion battery 24 is equal to or higher than the temperature T1 and is in a range of T1≤Tb<T2. If the temperature Tb is in the range of T1≤Tb<T2, a control is executed to increase the output distribution ratio of the engine E and reduce that of the motor generator MG according to this temperature range.

If the temperature Tb of the lithium-ion battery 24 is equal to or higher than the threshold value T2 and does not fall in the range of T1≤Tb<T2, it is determined whether or not the temperature Tb is in a range of T2≤Tb≤T3. If the temperature Tb is in the range of T2≤Tb≤T3, the outputs of the engine E and the motor generator MG are controlled at distribution ratios set in advance.

If the temperature Tb of the lithium-ion battery 24 is higher than the threshold value T3 and does not fall in the range of T2≤Tb≤T3, it is determined whether or not the temperature Tb is in a range of T3<Tb≤T4. If the temperature Tb is in the range of T3<Tb≤T4, a control is executed to increase the output distribution ratio of the engine E and reduce that of the motor generator MG according to this temperature range.

If the temperature Tb is not in the range of T3<Tb≤T4 and higher than T4, a control using only the engine E is executed.

The battery charger 23 is connected to the generator 22 coupled to the engine E. The controller C controls to set the battery charge to zero for the battery charger 23 if the battery temperature Tb further falls below the temperature T1 or further exceeds the temperature T4.

Further, the controller C controls such that the battery charger 23 limits the battery charge amount if the battery temperature Tb is in the range of T1≤Tb≤Tb<T2 and T3<Tb≤T4.

Furthermore, the controller C controls not to limit the battery charge amount of the battery charger 23 if the battery temperature Tb is in the range of T2≤Tb≤T3.

Although the embodiment of the present invention has been described above, the above embodiment is merely illustration of one application example of the present invention and not of the nature to limit the technical scope of the present invention to the specific configuration of the above embodiment.

The present application claims a priority based on Japanese Patent Application No. 2010-112077 filed with the Japan Patent Office on May 14, 2010, all the contents of which are hereby incorporated by reference.

INDUSTRIAL APPLICABILITY

The present invention can be used for hybrid construction machines such as power shovels.

The invention claimed is:

1. A hybrid construction machine, comprising:
   a main pump;
   an engine for driving the main pump;
   an assist pump connected to a discharge side of the main pump via a joint passage;
   a hydraulic motor rotated by return oil from an actuator;
   a motor generator linked to the assist pump and the hydraulic motor;
   an output control mechanism for controlling an output distribution ratio of the motor generator relative to the engine;
   an input control mechanism for controlling a hydraulic regeneration amount for the hydraulic motor;
   a battery associated with chemical reaction and connected to the motor generator;
   a temperature detection unit that detects the temperature of the battery;
   a determination unit that determines whether or not the temperature of the battery is lower than a threshold value in a low-temperature region or higher than a threshold value in a high-temperature region;
   a distribution ratio setting unit that reduces the output distribution ratio of the motor generator by controlling the output control mechanism and increases an output distribution ratio of the engine by an amount corresponding to a reduction in the output distribution ratio of the motor generator when the temperature of the battery is lower than the threshold value in the low-temperature region or higher than the threshold value in the high-temperature range; and
   a regeneration amount control unit that reduces the hydraulic regeneration amount for the hydraulic motor by controlling the input control mechanism when the temperature of the battery is lower than the threshold value in the low-temperature region or higher than the threshold value in the high-temperature region.

2. The hybrid construction machine according to claim 1, wherein:
   the input control mechanism is a flow controlling electromagnetic valve provided in a passage connecting the actuator and the hydraulic motor.

3. The hybrid construction machine according to claim 1, wherein:
   the hydraulic motor is a variable-displacement motor; and
   the input control mechanism is a tilting angle controller for controlling an tilting angle of the hydraulic motor.

4. The hybrid construction machine according to claim 1, wherein:
   the input control mechanism includes a flow controlling electromagnetic valve provided in a passage connecting the actuator and the hydraulic motor and a tilting angle controller for controlling an tilting angle of the hydraulic motor.

5. The hybrid construction machine according to claim 1, wherein:
   the output control mechanism controls a rotational speed of the motor generator.

6. The hybrid construction machine according to claim 1, wherein:
   the assist pump is a variable-displacement pump; and
   the output control mechanism is a tilting angle controller for controlling an tilting angle of the assist pump.

7. The hybrid construction machine according to claim 1, further comprising:
   a battery charge control unit that limits or zeroing a battery charge amount by controlling a battery charger when the temperature of the battery is lower than the threshold value in the low-temperature region or higher than the threshold value in the high-temperature region.

* * * * *